US010142442B2

(12) United States Patent
Singh et al.

(10) Patent No.: US 10,142,442 B2
(45) Date of Patent: *Nov. 27, 2018

(54) METHODS, SYSTEMS AND COMPUTER READABLE MEDIA FOR ENABLING A DOWNLOADABLE SERVICE TO ACCESS COMPONENTS IN A MOBILE DEVICE

(71) Applicant: MasterCard International Incorporated, Purchase, NY (US)

(72) Inventors: Dickey B. Singh, San Carlos, CA (US); Mohammad Khan, San Jose, CA (US); Venkata Sastry Akella, Sunnyvale, CA (US); Alan Marshall, Kirkland, WA (US); Sanjay Dalal, Fremont, CA (US); Pradeep Kumar, Fremont, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/622,767

(22) Filed: Feb. 13, 2015

(65) Prior Publication Data

US 2015/0222729 A1    Aug. 6, 2015

Related U.S. Application Data

(63) Continuation of application No. 13/661,993, filed on Oct. 26, 2012, now Pat. No. 8,959,143.

(Continued)

(51) Int. Cl.
*H04L 29/08* (2006.01)
*H04W 8/22* (2009.01)
(Continued)

(52) U.S. Cl.
CPC ......... *H04L 67/34* (2013.01); *G06Q 20/3278* (2013.01); *G06Q 20/36* (2013.01);
(Continued)

(58) Field of Classification Search
CPC ....... H04L 67/34; H04L 67/04; H04L 67/303; H04W 8/22
(Continued)

(56) References Cited

U.S. PATENT DOCUMENTS 6,038,673 A * 3/2000 Benn ............... G06F 1/3225
                                                    365/227
6,823,359 B1 * 11/2004 Heidingsfeld .... G06F 17/30893
                                                    707/E17.117
(Continued)

FOREIGN PATENT DOCUMENTS

KR    10-2011-0062620 A    6/2011
WO    WO 2008/103879 A2    8/2008
WO    WO 2013/063446 A1    5/2013

OTHER PUBLICATIONS

Notice of Allowance and Fee(s) Due for U.S. Appl. No. 13/661,993 (dated Oct. 1, 2014).

(Continued)

*Primary Examiner* — Minh Chau Nguyen
(74) *Attorney, Agent, or Firm* — Jenkins, Wilson, Taylor & Hunt, P.A.

(57) ABSTRACT

Methods, systems, and computer readable media for enabling a downloadable service to access components in a mobile device are disclosed. According to one aspect, a system comprises a mobile device that includes a mobile wallet application configured to determine at least one hardware component or software component provisioned on the mobile device and to generate a capabilities object containing information identifying the at least one hardware or software component. The system further includes a network server supporting a downloadable service configured to receive the capabilities object from the mobile device, to generate personalized downloadable service content based on the information in the received capabilities object, to (Continued)

provide the personalized web page content to the mobile device, wherein the personalized downloadable service content is configured to access the at least one hardware component or software component on the mobile device.

16 Claims, 3 Drawing Sheets

Related U.S. Application Data (60) Provisional application No. 61/551,790, filed on Oct. 26, 2011.

(51) Int. Cl.
*G06Q 30/06* (2012.01)
*G06Q 20/32* (2012.01)
*G06Q 20/36* (2012.01)

(52) U.S. Cl.
CPC ............ *G06Q 30/06* (2013.01); *H04L 67/04* (2013.01); *H04L 67/303* (2013.01); *H04W 8/22* (2013.01)

(58) Field of Classification Search
USPC .................................................. 709/201–203
See application file for complete search history.

(56) References Cited

U.S. PATENT DOCUMENTS

| | | |
|---|---|---|
| 2002/0026419 A1 | 2/2002 | Maritzen et al. |
| 2005/0071269 A1 | 3/2005 | Peters |
| 2005/0195435 A1* | 9/2005 | Kojima ............... H04N 1/00347 358/1.16 |
| 2006/0051157 A1* | 3/2006 | Bornstein ........... G06F 11/1435 401/206 |
| 2009/0049093 A1* | 2/2009 | Wassingbo .............. H04L 67/06 707/999.107 |
| 2012/0072481 A1* | 3/2012 | Nandlall ................ G06F 9/5027 709/203 |
| 2012/0209657 A1 | 8/2012 | Connolly |
| 2012/0210364 A1 | 8/2012 | Lee et al. |
| 2012/0304254 A1* | 11/2012 | Musfeldt ............... H04L 9/3234 726/2 |
| 2012/0304255 A1* | 11/2012 | Carnes ................. H04L 9/3234 726/3 |
| 2013/0263160 A1* | 10/2013 | Sandholm ............... G06F 9/541 719/328 |
| 2014/0122563 A1 | 5/2014 | Singh et al. |

OTHER PUBLICATIONS

Communication of European publication number and Information on the application of Article 37(3) EPC for European Application No. 12844496.5 (dated Aug. 6, 2014).

Non-Final Office Action for U.S. Appl. No. 13/661,993 (dated Jun. 19, 2014).

Non-Final Office Action for U.S. Appl. No. 13/661,993 (dated Feb. 20, 2014).

Notification of Transmittal of the International Search Report and the Written Opinion of the International Searching Authority, or the Declaration for International Patent Application No. PCT/US2012/062190 (dated Feb. 27, 2013).

* cited by examiner

METHODS, SYSTEMS AND COMPUTER READABLE MEDIA FOR ENABLING A DOWNLOADABLE SERVICE TO ACCESS COMPONENTS IN A MOBILE DEVICE

PRIORITY CLAIM

This application is a continuation of U.S. patent application Ser. No. 13/661,993, filed Oct. 26, 2012, which claims the benefit of U.S. Provisional Patent Application Ser. No. 61/551,790, filed Oct. 26, 2011; the disclosures of each which are incorporated herein by reference in their entireties.

TECHNICAL FIELD

The subject matter described herein relates to modifying web page content with respect to mobile phones and other devices. More particularly, the subject matter described herein relates to systems, methods, and computer readable media for enabling a downloadable service to access components in a mobile device.

BACKGROUND

Mobile devices are presently being configured to utilize mobile wallet applications to perform a number of payment and non-payment tasks. The mobile wallet application is evolving into an ecosystem component, thereby creating a need for downloading third party services securely on the mobile device to extend the capabilities of the mobile wallet application. The selection of third party downloadable services may be based on a consumer's preferences, location, supplier, carrier, handset provider, issuer, and the like. However, these third party downloadable services are typically displayed to the user irrespective of the hardware and software components provisioned on the mobile device. Notably, it is currently not possible in a mobile environment for a host network server to modify the contents of a downloadable service (e.g., a web page) based on the hardware and software components/capabilities of a mobile device.

Accordingly, there is a need for systems, methods, and computer readable media for enabling a downloadable service to access components in a mobile device.

SUMMARY

According to one aspect, the subject matter described herein includes a system for enabling a downloadable service to access components in a mobile device. In one embodiment, the system comprises a mobile device that includes a mobile wallet application configured to determine at least one hardware component or software component provisioned on the mobile device and to generate a capabilities object containing information identifying the at least one hardware or software component. The system further includes a network server supporting a downloadable service configured to receive the capabilities object from the mobile device, to generate personalized downloadable service content based on the information in the received capabilities object, to provide the personalized web page content to the mobile device, wherein the personalized downloadable service content is configured to access the at least one hardware component or software component on the mobile device.

The subject matter described herein may be implemented in hardware, software, firmware, or any combination thereof. As such, the terms "function" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

The present subject matter includes systems, methods, and computer readable media for enabling a downloadable service to access components in a mobile device. In one embodiment, a mobile wallet application provisioned on a mobile device may be configured to collect and provide hardware and/or software component information to a network server that hosts the downloadable service (e.g., a web server hosting a web page). The hardware and software components are then identified or detailed in a capabilities object, which is subsequently provided by the mobile device to the network server. By exposing (i.e., disclosing) the component/capability data to the host network server, certain elements or interface options associated with an accessed downloadable service (i.e., web page) may either be displayed or hidden depending on the capabilities of the mobile device. Namely, the contents of the accessed web page is personalized based on the mobile device's activated hardware components and stored software data, thereby effectively increasing the functionality of the accessed web page to the mobile device user. For example, the customization may include presenting a quick response (QR) code scanner interface option on a web page if both camera hardware and a QR code scanning library exist on the mobile device. Similarly, a web page may provide secure element related services if a secure element exists on the mobile device.

Figure 1:
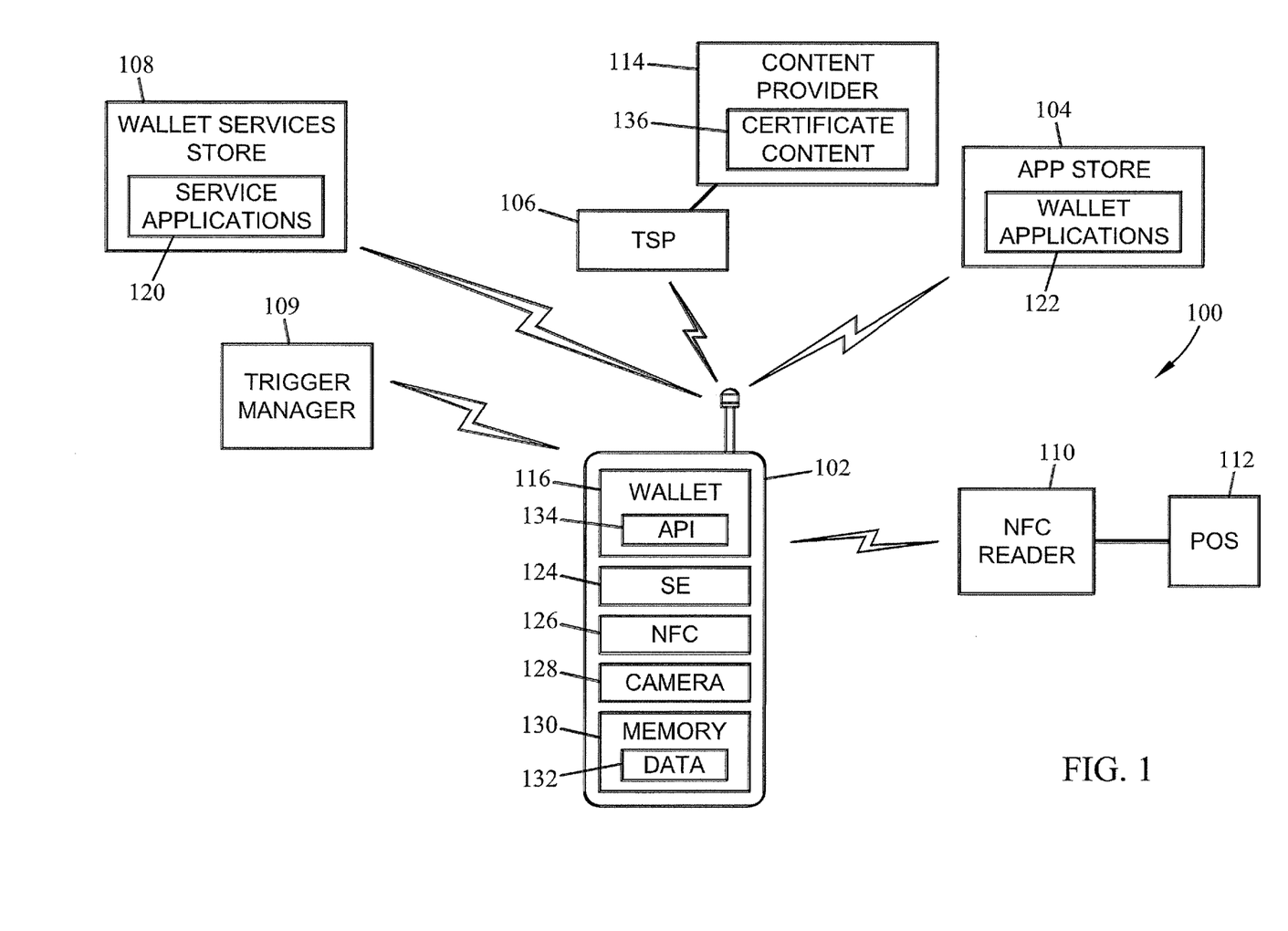
FIG. 1 is block diagram illustrating an exemplary system for enabling a downloadable service to access components in a mobile device according to an embodiment of the subject matter described herein.

FIG. 1 depicts an exemplary system 100 that includes a mobile device 102 that is communicatively connected to one or more of an application store server 104 (e.g., Google Android Market, iOS App Store, Amazon Appstore for Android, Blackberry App World, etc.), a trusted service provider (TSP) server 106, a wallet services store server 108, a trigger manager server 109 (i.e., part of Touch Services) and a near field communications (NFC) reader 110 (or an NFC payment terminal). Notably, the aforementioned communication connections comprise wireless communication links.

Mobile device 102 may include a near field communications (NFC) enabled mobile device, such as smart phone, personal digital assistant (PDA), tablet, or any other like device that is configured to wirelessly communicate via NFC radio. For example, mobile device 102 may include a hardware based NFC module 126 that enables mobile device 102 to send and receive NFC signals. Mobile device 102 may also be provisioned with a mobile wallet application 116 that is used to facilitate secure payment and non-payment transactions via NFC. Mobile wallet application 116 may be configured to manage, select and utilize various software based electronic certificates or "softcards" used to conduct the NFC payment and/or non-payment transactions. Exemplary softcards, which may be stored in non-secure memory 130 or secure element 124, include payment and non-payment electronic certificates, such as, electronic credit cards, electronic loyalty cards, electronic tickets, electronic debit cards, electronic loyalty reward certificates, electronic coupons, electronic gift cards, electronic prepaid cards, and the like. In one embodiment, the softcards may be securely downloaded from a trusted service provider (TSP) server 106 (or a trusted service manager for service providers server) to mobile wallet application 116. In one embodiment, TSP server 106 communicates with a content provider server 114 to obtain the softcard or electronic certificate data 136 that is to be provisioned on mobile device 102. Additional information, such as a check balance, check due date, or reward points may also be securely obtained from trusted service provider (TSP) server 106 and/or a service-specific add-on services gateway (not shown).

In one embodiment, mobile wallet application 116 may also include a native software based application or module that is configured to access hardware components located in mobile device 102. As a native application, mobile wallet application 116 may access hardware components such as a secure element 124, NFC module 126, a camera 128 (e.g., a still camera and/or video camera), memory 130, and the like. Additional hardware components (not shown) that may be accessed include, but are not limited to, an accelerometer, add-on peripherals, WiFi, 3G/Edge/LTE, Bluetooth, Zigbee, a global positioning system (GPS) chip, and the like. Mobile wallet application 116 may also be configure to access software components (i.e., local software content) stored on mobile device 102. Examples of software components include, but not limited to, a calculator program, a stock price/quote checker program, a currency conversion program, a stored/designated default credit card, wallet state information, and the like. Mobile wallet application 116 is also configured to generate capabilities objects, which identify and/or detail the available hardware and software components provisioned on mobile device 102. In one embodiment, a capabilities object may include a software based construct or object that may contain data or functions associated with mobile device 102. The capabilities object may be stored anywhere within mobile device 102, such as capabilities object data 132 in memory 130 or in secure element 124. Mobile wallet application 116 may also be configured to utilize application programming interfaces (APIs) to i) determine the aforementioned available hardware and software components, ii) communicate with down-loadable services provisioned on the mobile device, and iii) communicate with network servers. In one embodiment, mobile wallet application 116 may be originally provisioned on mobile device 102 by being downloaded from application store 104. Application store 104 may wirelessly provision a number of different types of mobile wallet applications 122 (e.g., a bank wallet, a merchant wallet, a carrier wallet, and the like) to a mobile device.

Mobile device 102 may also be provisioned with a secure element 124. In one embodiment, secure element 124 may include any high security memory area that may be provisioned in a subscriber identity module (SIM) card, embedded memory, or added on (e.g., a MicroSD memory card). Similarly, secure element 124 may include other forms of secured memory, such as memory included in the main processor itself (e.g., "Trust Zone"). As used herein, the terms "secure element", "secure memory", and "secure memory element" includes one or more of the aforementioned forms of secured memory embodiments.

Mobile device is further provisioned with an NFC module 126 and memory 130. NFC module 126 may be configured to establish an NFC link between mobile device 102 and a second NFC enabled device, such as NFC reader 110. In one embodiment, NFC module 126 may comprise a hardware based circuit or chip. In some embodiments, the NFC link established by NFC module 126 may be secure or unsecure. Memory 130 may comprise a non-secure baseband memory that is configured to store data 132.

In one embodiment, a user utilizes mobile device 102 to establish communication with a network server to obtain a downloadable service. For example, mobile device 102 may utilize a web browser or mobile wallet application 116 to communicate with a web content server or wallet services store server 108 that contains a plurality of downloadable service applications 120. After establishing communication with the network server, the downloadable content data may be provisioned on mobile device 102. For example, the downloadable content may include web page content data. In one embodiment, the communication with the network server may be established with a mobile wallet application API 134. Mobile device 102 may also be configured to communicate (and obtain downloadable services) via APIs with a trigger manager 109, which is communicatively connected to other network servers and/or downloadable content providers. Similarly, mobile device 102 may acquire a downloadable service by wirelessly communicating with NFC reader 110 and/or point of sale (POS) device 112 (via NFC reader 110). In this scenario, the downloadable content may be stored locally at point of sale (POS) device 112 or may be obtained from another network server by point of sale (POS) device 112.

After receiving the web page content data, mobile wallet application 116 initiates a process that exposes (i.e., discloses) the hardware and software components of mobile device 102 and enables the displayed web page content to be personalized/customized for the capabilities of mobile device 102. In one embodiment, the process is initiated by mobile wallet application 116 determining the hardware and software components provisioned on mobile device 102. For example, mobile wallet application 116 may be configured to utilize low level APIs to collect data indicating the number and types of hardware components and software components contained within mobile device 102.

In one embodiment, mobile wallet application 116 provides a native method to determine the status of a hardware and/or software component. Specifically, implementation of determining the hardware and software components is written natively on each mobile device platform, but is exposed to a network server in a uniform platform-independent manner via a capabilities object. For example, an exemplary query made by mobile wallet application 116 to determine if mobile device 102 is equipped with NFC service discovery and a camera may include the following:

```
<BODY>
    <SCRIPT LANGUAGE="JavaScript">
        if(walletCapabilites.isNFCServiceDiscoveryAvailable( )
        && walletCapabilites.isCameraAvailable( )){
            document.write (
                "<a href=wallet://ScanQRCode>Tap or Scan QR
                Code</a>");
        }
        else if(walletCapabilites.isNFCServiceDiscoveryAvailable( )){
            document.write (
                "<a href=wallet://ScanQRCode>Tap </a>");
        } else if(walletCapabilites.isCameraAvailable( )) {
            document.write (
                "<a href=wallet://ScanQRCode>Scan QR Code</a>");
        }
    </SCRIPT>
</BODY>
```

Although this exemplary query only determines if mobile device 102 includes NFC service discovery and camera capabilities, additional hardware (or software) components may be inquired in a similar manner without departing from the scope of the present subject matter.

After determining the current hardware and software components/capabilities of mobile device 102, mobile wallet application 116 may be configured to generate a capabilities object that exposes/discloses the hardware capabilities and software (e.g., wallet) capabilities associated with mobile device 102. As mentioned above, mobile wallet application 116 may utilize APIs that are native to the platform to determine the hardware and software components of mobile device 102. In one embodiment, the generated capabilities object may contain functions that learn/monitor the existence of hardware and software components and capability features, such as NFC capability, QR scanning with a camera capability, wallet features (e.g., existence of default electronic payment card), and the like. In one embodiment, the capabilities object may be created on the fly by mobile wallet application 116, which checks the hardware and software components in mobile device 102 in real-time and provides the capabilities object to the network server that hosts the downloadable service (e.g., a loading web page). The capabilities object may include the most recent state of the hardware and software (i.e., wallet) capabilities available for use by the downloadable service and/or host network server. For example, the state of the wallet may change and hence the capabilities exposed to the web application may not always be static. Notably, software components (e.g., the capabilities of mobile wallet application 116) and/or activated hardware components on mobile device 102 may frequently change. For example, a user may change the default card selected for payment in mobile wallet application 116 or the NFC chip 126 may be temporarily deactivated (e.g., to conserve battery power) from settings/preferences.

In one embodiment, an exemplary capabilities object may be embodied as:

```
final class WalletCapabilitiesClass {
    WalletCapabilitiesClass ( ) {
```
-continued

```
    }
    public boolean isNFCServiceDiscoveryAvailable ( ) {
        //Native Implementation
        //is specific to hardware
    }
    public boolean isCameraAvailable ( ) {
        //Native Implementation
        //is specific to hardware
    }
    public boolean isDefaultCardAvailable ( ) {
        //Native Implementation
        //is specific to hardware
    }
    public boolean isSecureElementAvailable ( ) {
        //Native Implementation
        //is specific to hardware
    }
}
```

Although this capabilities object presented above is written in an Android based software code, the capabilities object may be generated in any protocol without departing from the scope of the present subject matter. In one embodiment, the capabilities object may be stored in memory 130 as capabilities object data 132 prior to being sent to a network server (e.g., wallet services store server 108).

After generating a capabilities object, mobile wallet application 116 may then expose the existing hardware and software components to the network server hosting the downloadable content. In one embodiment, mobile wallet application 116 may be configured to instantiate the capabilities object and wirelessly transmit the capability object instance containing the hardware and software component data to the network server. For example, an API associated with mobile wallet application 116 may communicate with an API associated with the network server (e.g., wallet services store server 108) to provide the capabilities object over an established channel (e.g., using JavaScript code).

After receiving the capabilities object from mobile device 102, the network server may then access/process the received capabilities object and generate personalized/customized downloadable service content, such as web page content, for mobile device 102. The web page content may be personalized based on the active hardware components and stored/cached software content provisioned on mobile device 102. In one embodiment, the web server is configured to modify the web page content by including/embedding protocol handlers (e.g., add wallet:// or local:// protocol handlers) in the personalized web page content/code. In one example, the network server includes one or more protocol handlers in the personalized downloadable service content, wherein the one or more protocol handlers are specifically associated with one or more of the hardware and/or software components identified in the capabilities object. Thus, the personalized downloadable service content may be configured to provide an interface option associated with each of the newly included protocol handers.

Once the personalized web page content is modified, the network server sends the personalized web page content back to mobile device 102. In one embodiment, the personalized web page content is uploaded to mobile device via a wireless Internet connection. The communication link between mobile device 102 and the sending network server may be established using APIs.

Upon receiving the personalized web page content, mobile wallet application 116 processes (e.g., executes/runs) the personalized downloadable service content. In one embodiment, the protocol handler(s) included in the personalized web page content establishes a link to the hardware and software components that were previously included in the capabilities object. For example, an API embedded in a customized web page (or data driven page) may access hardware or software components on mobile device 102 utilizing protocol handlers (if an interface option associated with a linked protocol handler is selected on the displayed web page by a user). Exemplary protocol handlers for accessing camera 128, a default softcard (e.g., to conduct a payment), and NFC module 126 respectively include:

- wallet://camera/scanQRCode
- wallet://PayWithDefaultCard?cb=a.b.com/d/123
- wallet://TapNFCService As mentioned above, the customized web page content based on local hardware and software capabilities provides a user of mobile device 102 with interface options to interact with the web page. After the link is established, mobile wallet application 116 utilizes the personalized web page to include interface options associated with the hardware and software components in a displayed web page (i.e., a web page displaying the personalized/customized downloadable service content). For example, if the network server was provided with a capabilities object that indicated that mobile device 102 had NFC and QR scanning capabilities, then the customized web page content would display an NFC tap or QR scan interface options (e.g., to tap a smart tag or scan a QR code associated with a consumer product) to the user. If mobile device 102 is not provisioned with these hardware components (or these capabilities were deactivated), then the customized web page may only display a text box to receive an inputted code or search term (e.g., associated with the consumer product).

In one embodiment, mobile device 102 may include a lightweight mobile monitoring program (not shown) that is configured to monitor selected request schemes (i.e., a specific portion of a protocol handler), such as those triggered by selecting options on the customized web page. Exemplary, request schemes may include http://, wallet://, local://, and the like. In one embodiment, if the monitoring program determines that the request scheme does not match wallet:// or local://, then the request scheme may be processed by mobile device 102 in a normal manner. However, if the monitoring program detects a request scheme that matches either wallet:// or local:// (and others supported by the monitoring program), the monitoring program subsequently directs the protocol handler (i.e., the request scheme and associated URI) to either a wallet scheme handler module or a local scheme handler module. Notably, the scheme handler modules are responsible for communicating with the underlying hardware or software component to executing a particular task. For example, the wallet scheme handler module parses the uniform resource identifier (URI) included with the scheme request "wallet://" to obtain information that can be translated into a command. In one embodiment, the protocol handler "wallet://Pay/DefaultCard" may translate into "Paying with Default Payment Card". After parsing, the wallet scheme handler may utilize an API to invoke an appropriate hardware or software component to perform the task.

Similarly, a local scheme handler module may parse the URI included with the local:// request to obtain information that can be translated into a command. For example, the local scheme handler module may parse the URI included in the protocol handler and subsequently locate the required file, image, or other data stored locally on mobile device 102. After parsing, the local scheme handler may use an API to invoke an appropriate hardware or software component to perform the task.

Figure 2A:
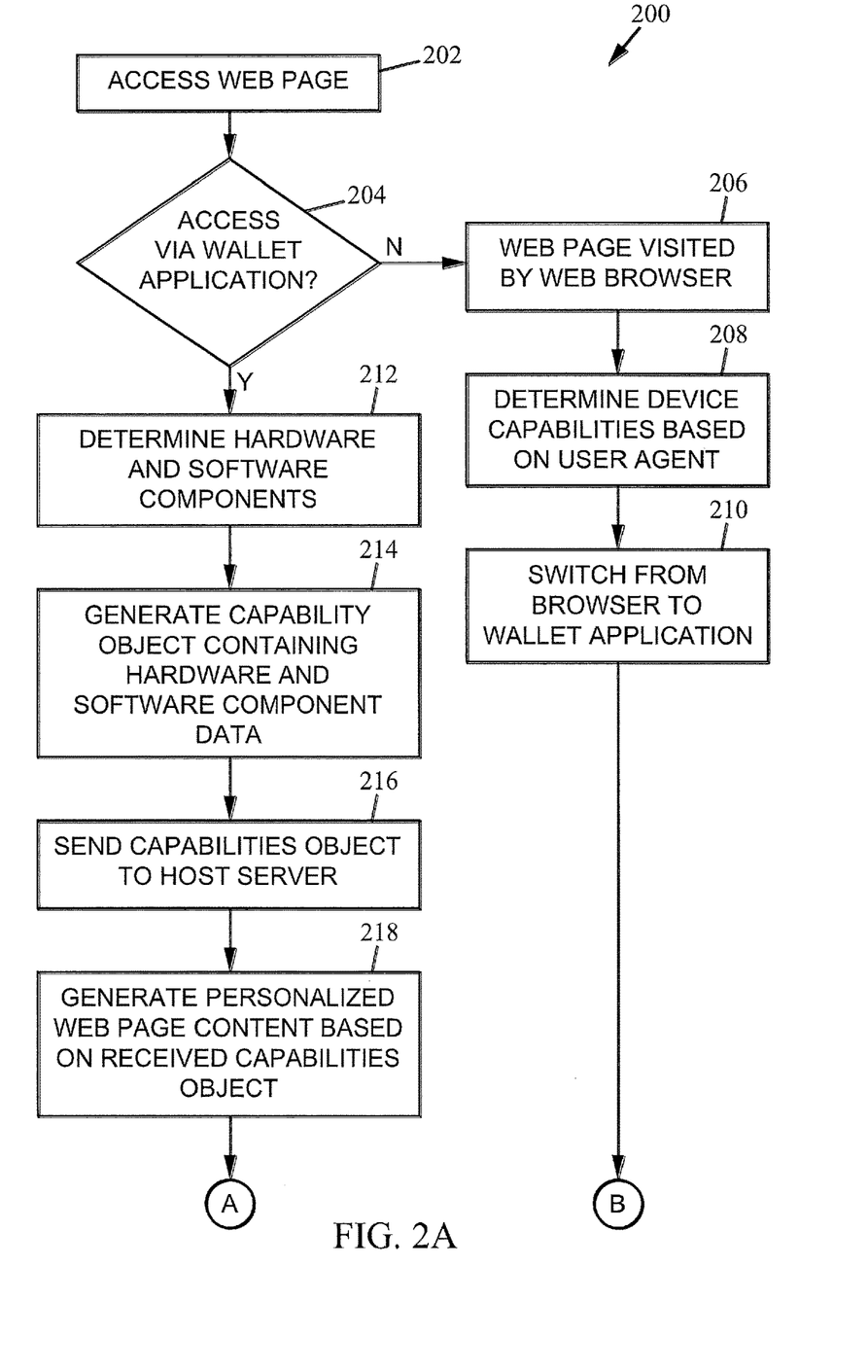
FIGS. 2A and 2B are flow charts illustrating an exemplary process for enabling a downloadable service to access components in a mobile device according to an embodiment of the subject matter described herein.
Figure 2B:
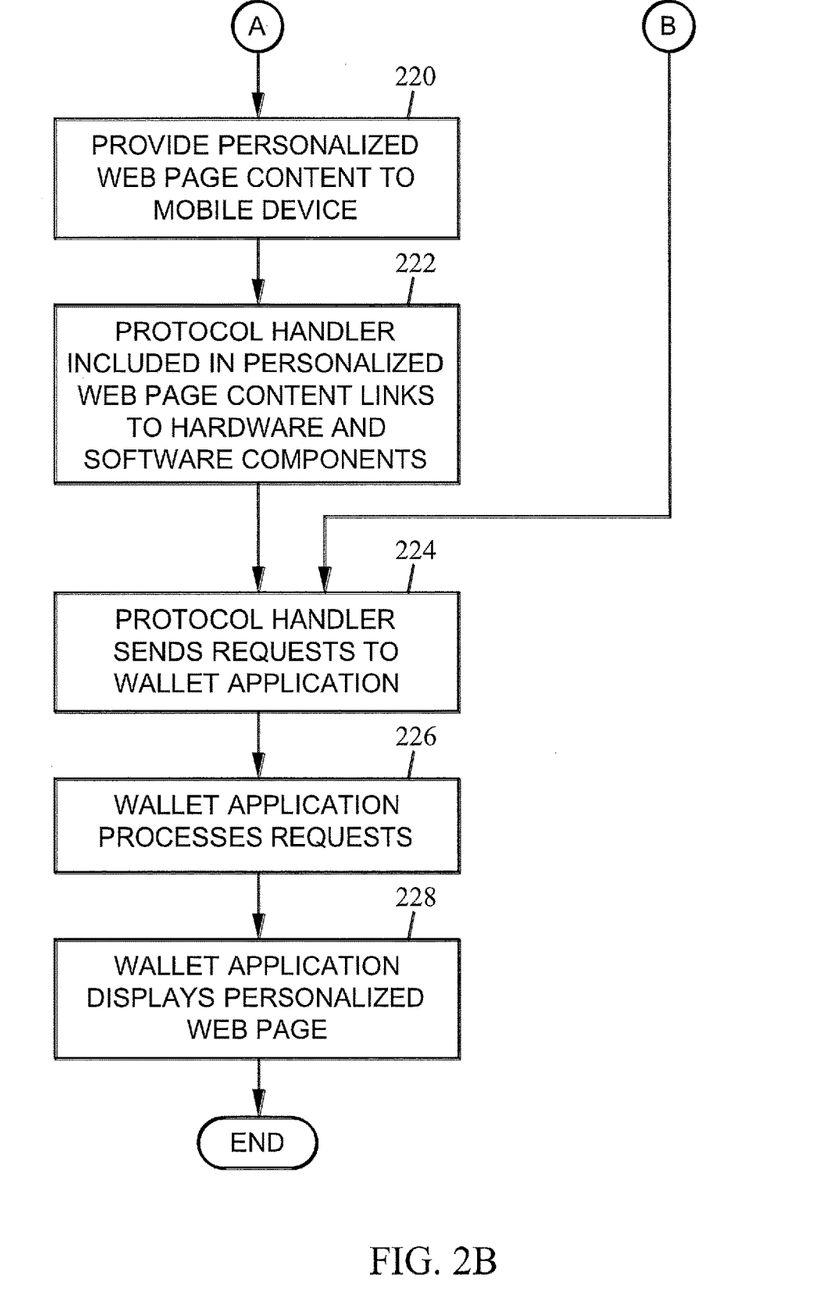

FIGS. 2A and 2B are flow charts illustrating an exemplary process for enabling a downloadable service to access components in a mobile device according to an embodiment of the subject matter described herein. In block 202, a web site or web page is accessed. In one embodiment, a mobile device is utilized to visit and access a particular downloadable service that is associated with a web site or web page. For example, wallet service store 108 in FIG. 1 may contain a mobile banking application, a person to person P2P application, or a coffee ordering application that may be accessible via a web page.

In block 204, a determination is made as to whether the web page is accessed using a mobile wallet application. If the web page is accessed using a mobile wallet application, then method 200 proceeds to block 212. Otherwise, method 200 continues to block 206.

In block 206, it is determined that the web page is accessed using a web browser (e.g., Safari, Firefox, etc.) provisioned on the mobile device.

In block 208, the mobile device capabilities are determined by a web server. For example, the web server may determine the hardware and software components (e.g., activated hardware capabilities and/or local software content) on the mobile device based on communication/interaction with a user agent module provisioned on the mobile device.

In block 210, a switch from the web browser to the mobile wallet application may be performed. In one embodiment, the mobile device automatically switches over to mobile wallet application if a particular web page is accessed. For example, if a user selects or clicks on a link on a web page that contains a wallet:// or local:// protocol handler, the mobile device will close out of the web browser and initiate a mobile wallet application. Method 200 continues to block 224.

In block 212, the hardware and software components (i.e., active hardware components and local software content) provisioned on the mobile device is determined. In one embodiment, the mobile wallet application utilizes APIs to determine which hardware components provisioned on the mobile device are activated (e.g., turned on and accessible for use). The mobile wallet application may also be configured to determine software components (e.g., wallet state or local software content) that are stored on the mobile device. For example, the software components may include a previously downloaded application, the wallet state, or cached data content.

In block 214, a capabilities object containing the active hardware and software components is generated. In one embodiment, the mobile wallet application creates a capabilities object (or any other like software based construct) that contains the activated hardware components and/or software components provisioned on the mobile device.

In block 216, the capabilities object is sent to a web server. In one embodiment, the mobile wallet application may be configured to instantiate the capabilities object and wirelessly transmit the instance containing the hardware and software data to a web server that hosts the web page content. For example, an API associated with the mobile wallet application may communicate with an API associated with the web server to provide the capabilities object over an established channel (e.g., using JavaScript code).

In block 218, personalized web page content is generated. In one embodiment, the web server processes the received capabilities object and generates personalized (e.g., customized) web page content for the associated mobile device. Notably, the web page content is personalized based on the active hardware components and stored/cached software content provisioned on the mobile device. In one embodiment, the web server is configured to change the web page content by including/embedding protocol handlers (e.g., add wallet:// or local:// protocol handlers) in the web page code.

In block 220, the personalized web page content is sent. In one embodiment, the web server provides the personalized web page content to the mobile device associated with the capabilities object. For example, the personalized web page content is uploaded to mobile device via a wireless Internet connection.

In block 222, a protocol handler links to one or more of the hardware and software components in the mobile device. In one embodiment, at least one protocol hander that is included in the personalized web page content initiates a link or connection to an active hardware component and/or to stored software content in the mobile device.

In block 224, requests are sent to the mobile wallet application. In one embodiment, a user select the at least one protocol handler in the personalized web page content sends a request to the mobile wallet application. In one embodiment, an API call into a mobile wallet application is made by the monitoring program, based on the request in the protocol handler uniform resource locator (URL) or URI.

In block 226, the mobile wallet application processes the request. In one embodiment, the mobile wallet application processes (e.g., executes/runs) the personalized web page content in response to the request.

In block 228, the personalized web page is displayed. In one embodiment, the mobile wallet application is configured to display the personalized web page, which includes interface options that link to the hardware and software components. For example, if the mobile device includes hardware that supports NFC service discovery (i.e. the ability for the mobile device to be tapped on a smart shelf tag equipped with an NFC tag), the web page may display an interface option that prompts a user to tap mobile device on an in-store smart shelf tag. Alternatively, a web page when loaded on a mobile device that does not support service discovery, may instead display a search box and request the user to input a code listed on the shelf tag.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for enabling a downloadable service to access components in a mobile device, the system comprising:
   a network server supporting a downloadable service application that, when executed by a processor of the network server, is configured to:
   receive a capabilities object from a mobile device, wherein the capabilities object includes information that identifies a most recent state of at least one hardware component on the mobile device;
   generate personalized downloadable service content based on the most recent state of the at least one hardware components in the received capabilities object, wherein the most recent state of the at least one hardware component indicates whether the at least one hardware component is active and available for use by the mobile device; and
   provide the personalized downloadable service content to the mobile device, wherein the personalized downloadable service content is configured to access the at least one hardware component on the mobile device, wherein the personalized downloadable service content includes personalized web page content including one or more displayed web page interface options for utilizing the at least one hardware component, wherein the personalized web page content is modified prior to being sent to the mobile device by the network server to include at least one embedded protocol handler based on the at least one hardware component indicated to be active and available by the capabilities object that is received from the mobile device.

2. The system of claim 1 wherein the mobile device includes a mobile wallet application that is configured to determine the at least one hardware component or software component on the mobile device and to generate the capabilities object.

3. The system of claim 2 wherein the personalized downloadable service content includes software code that contains the at least one embedded protocol handler that is configured to access the at least one hardware component or software component on the mobile device.

4. The system of claim 3 wherein the mobile wallet application receives, from the at least one embedded protocol handler, a request to provide an interface option to access the at least one hardware component or software component.

5. The system of claim 2 wherein the mobile wallet application utilizes application programming interfaces (APIs) to determine the at least one hardware component or software component on the mobile device.

6. The system of claim 2 wherein the at least one hardware component or software component is accessed by the mobile wallet application irrespective of the operating system platform supported by the mobile device and without the emulation of software code.

7. The system of claim 2 wherein the capabilities object is received by the network server via communication between an application programming interface (API) associated with the mobile wallet application and an API associated with the network server.

8. A method for enabling a downloadable service to access components in a mobile device, the method comprising:
   receiving, at a network server supporting a downloadable service application, a capabilities object from a mobile device, wherein the capabilities object includes information that identifies a most recent state of at least one hardware component on the mobile device;
   generating personalized downloadable service content based on the most recent state of the at least one hardware components in the received capabilities object, wherein the most recent state of the at least one hardware component indicates whether the at least one hardware component is active and available for use by the mobile device; and
   providing the personalized downloadable service content to the mobile device, wherein the personalized downloadable service content is configured to access the at least one hardware component on the mobile device, wherein the personalized downloadable service content includes personalized web page content including one or more displayed web page interface options for utilizing the at least one hardware component, wherein the personalized web page content is modified prior to being sent to the mobile device by the network server to include at least one embedded protocol handler based on the at least one hardware component indicated to be active and available by the capabilities object that is received from the mobile device.

9. The method of claim 8 wherein the mobile device includes a mobile wallet application that is configured to determine the at least one hardware component or software component on the mobile device and to generate the capabilities object.

10. The method of claim 9 wherein providing the personalized downloadable service content includes providing software code that contains at least one embedded protocol handler that is configured to access the at least one hardware component or software component on the mobile device.

11. The method of claim 10 wherein the mobile wallet application receives, from the at least one embedded protocol handler, a request to provide an interface option to access the at least one hardware component or software component.

12. The method of claim 9 wherein the mobile wallet application utilizes application programming interfaces (APIs) to determine the at least one hardware component or software component on the mobile device.

13. The method of claim 9 wherein the at least one hardware component or software component is accessed by the mobile wallet application irrespective of the operating system platform supported by the mobile device and without the emulation of software code.

14. The method of claim 9 comprising receiving the capabilities object via communication between an application programming interface (API) associated with the mobile wallet application and an API associated with the network server.

15. A non-transitory computer readable medium having stored thereon executable instructions that when executed by the processor of a computer control the computer to perform steps comprising:

receiving, at a network server supporting a downloadable service, a capabilities object from a mobile device, wherein the capabilities object includes information that identifies a most recent state of at least one hardware component on the mobile device;

generating personalized downloadable service content based on the most recent state of the at least one hardware components in the received capabilities object, wherein the most recent state of the at least one hardware component indicates whether the at least one hardware component is active and available for use by the mobile device; and providing the personalized downloadable service content to the mobile device, wherein the personalized downloadable service content is configured to access the at least one hardware component or software component on the mobile device, wherein the personalized downloadable service content includes personalized web page content including one or more displayed web page interface options for utilizing the at least one hardware component, wherein the personalized web page content is modified prior to being sent to the mobile device by the network server to include at least one embedded protocol handler based on the at least one hardware component indicated to be active and available by the capabilities object that is received from the mobile device.

16. The computer readable medium of claim 15 wherein providing the personalized downloadable service content includes providing software code that contains at least one embedded protocol handler that is configured to access the at least one hardware component or software component on the mobile device.

* * * * *